July 9, 1968  E. A. H. HONORE ET AL  3,392,389
METHOD AND MEANS FOR RADIOLOCATING A RADIO RECEIVING STATION
Filed Sept. 15, 1966

FIG.2 — PRIOR ART

INVENTORS
ETIENNE AUGUSTIN HENRI HONORE
EMILE LEON GABRIEL TORCHEUX

BY Craig & Antonelli
ATTORNEYS

United States Patent Office 3,392,389
Patented July 9, 1968

3,392,389
METHOD AND MEANS FOR RADIOLOCATING A RADIO RECEIVING STATION
Etienne Augustin Henri Honore, Chatenay-Malabry, and Emile Leon Gabriel Torcheux, Paris, France, assignors to Societe d'Etude et d'Application des Techniques Nouvelles, Paris, France, a corporation of France
Filed Sept. 15, 1966, Ser. No. 579,757
Claims priority, application France, Sept. 21, 1965, 32,035
4 Claims. (Cl. 343—105)

ABSTRACT OF THE DISCLOSURE

A radiolocating method and apparatus is described which employs a first transmiter for radiating two pure waves $F_1$ and $F_3$ and a second transmitter for radiating two pure waves $F_2$ and $F_4$. The invention also provides a receiver station to produce beat waves of equal frequency $f=F_1-F_2=F_3-F_4$ in corresponding channels of the receiver station. The invention is characterized by producing at the receiver station a local frequency tuned substantially to the beat frequency $f$ and measuring the phase difference between the local frequency and that supplied by one of the channels of the receiver. The phase difference is divided by a predetermined figure $$N=\frac{F_1+F_2}{2(F_1-F_3)}$$

so as to produce the desired radiolocating measurement. The frequency of the signal in one of the receiver channels is phase shifted with the divided phase difference and the phase shifted frequency is compared with the beat frequency in the remaining channel of the receiver so as to produce an adjusting voltage that is used to maintain the local frequency $f$ constant.

Our invention has for its object a method for radio localisation resorting to measurements of phase differences.

It should be first remembered that the conventional method for radio localisation through measurements of differences of phase resorts to four pure waves produced simultaneously, the frequencies of said waves being substantially unvarying and equal to $F_1$, $F_2$, $F_3$ and $F_4$, the waves $F_1$ and $F_3$ being radiated by a first transmitter located at a point A while the waves $F_2$ and $F_4$ are radiated by a second transmitter located at another point B. By the term "pure wave" is meant a wave that is not modulated.

A suitable control system is designed so that the four radiated waves satisfy simultaneously the two following relationships.

The beat frequencies between the waves $F_1$ and $F_2$ on the one hand and $F_3$ and $F_4$ on the other hand have the same value $f$ so that the following equation is true permanently $F_1-F_2=F_3-F_4=f$.

The relative phases of the two beat frequencies $F_1-F_2$ and $F_3-F_4$ when received at any predetermined fixed point do not vary.

Under such conditions, the phase difference between said beat waves supplies the locus of the points at which the receiving station may be located. Said receiving station located at a point C receives the four waves $F_1$, $F_2$, $F_3$, $F_4$. The receiver produces in a first channel a beat frequency $F_1-F_2$ and in a second channel the beat frequency $F_3-F_4$ while a phasemeter measures the phase difference between said two beat frequencies which are both equal to $f$.

It is of interest to illustrate by an example the magnitude of the frequencies appearing in such a method.

The beat $f$ is of a magnitude of about 100 cycles per second while the frequencies F are selected in the range of $10^6$ cycles per second, that is 100 megacycles, the magnitude of the difference $F_1-F_3$ being of about one megacycle.

Such an arrangement produces in practice excellent results associated however with different limitations by reason in particular of the comparatively low value of the ratio between signal and noise.

In other words, the accuracy of the indications supplied by the phasemeter depends to a large extent on the intensity of the noise produced by the transmission of the waves between the two transmitting stations and the receiving station. The expression "noise" is intended to convey the meaning of all parasitic phenomena deforming the received signals and introducing undesired parasitic signals, such noises being produced as well by the atmospherics as by multiple echoes or the like interfering radio-electric signals.

Our invention has for its object to improve to a considerable extent the accuracy and faithfulness of the measurements executed at the receiving station and consequently of the results supplied by a radio-navigation system of the type disclosed hereinabove.

Our invention covers consequently an improved arrangement of the transmitting means which allows benefiting to a maximum extent by the advantages provided by said improved receivers.

Applicants' investigations which have led to the present invention were based on the following considerations:

If an ideal low frequency oscillator were available at the receiving station, of which oscillator the frequency were constantly equal to the common value $f$ of the frequencies of the beat waves $F_1-F_2$ and $F_3-F_4$ as they are received at any stationary point, it would be found that the phase shift measured between the voltage of said local oscillator and that supplied by the first or second channel varies when the receiver moves to a much greater extent than the phase difference between the beat waves of the first and of the second channel.

This is due to the fact that the frequencies $F_1$, $F_2$, $F_3$ and $F_4$ are much higher than the difference between the values of the frequencies $F_1$ and $F_3$. For instance in the example given out hereinabove $F_1-F_3=10^6$ cycles per second and $F_1=10^8$ so that the ratio $$\frac{F_1}{F_1-F_3}=100$$

In other words, when the position of the receiving station changes, the phase difference measured in accordance with the known method is equal for instance to 1° whereas the phase difference between such a theoretical oscillator and the beat voltage in the first channel varies by 100° and that between said theoretical oscillator and the beat voltage of the second channel varies by 101°, the difference between said two differences being equal to 1° which is the sole value actually measured with the known prior method.

The above data may be readily checked in the following manner: it will be assumed for sake of simplicity, without said assumption modifying by any means the scope of the following remarks, that the amplitudes of the four radiated waves $F_1$, $F_2$, $F_3$, $F_4$ pass simultaneously through a zero value.

Under such conditions, the voltages of the four waves received at the receiving station are given out by the following expressions:

$$\cos 2\pi F_1\left(t - \frac{D_1}{V}\right)$$

$$\cos 2\pi F_2\left(t - \frac{D_2}{V}\right)$$

$$\cos 2\pi F_3\left(t - \frac{D_1}{V}\right)$$

$$\cos 2\pi F_4\left(t - \frac{D_2}{V}\right)$$

In said formulae, $t$ designates time, $D_1$ the distance AC separating the first transmitter from the receiver, $D_2$ the distance BC between the second transmitter and the receiver and V the speed of propagation of electro-magnetic waves.

The beats between $F_1$ and $F_2$ have consequently for their values the following expressions $$\cos (2\pi ft - \varphi_1)$$

and those between $F_3$ and $F_4$ the values $$\cos (2\pi ft - \varphi_2)$$

and $\varphi_1$, $\varphi_2$ designating the expressions $$\varphi_1 = \frac{2\pi}{V}(F_1 D_1 - F_2 D_2)$$

$$\varphi_2 = \frac{2\pi}{V}(F_3 D_1 - F_4 D_2)$$

Taking into account the central frequencies F and F' in the two receiver channels which are such that $$2F = F_1 + F_2$$

and $$2F' = F_3 + F_4$$

the following equations are true:

$$\varphi_1 = \frac{2\pi}{V}\left[F(D_1 - D_2) + \frac{f}{2}(D_1 + D_2)\right]$$

$$\varphi_2 = \frac{2\pi}{V}\left[F'(D_1 - D_2) + \frac{f}{2}(D_1 + D_2)\right]$$

Now the term $$\frac{f}{2}(D_1 + D_2)$$

is quite negligible when compared with the first term of each of said formulae since the ratio $F/f$ is of a magnitude of $10^4$ so that it is possible to write down with a negligible error the two formulae:

$$\varphi_1 = \frac{2\pi}{V} F(D_1 - D_2)$$

$$\varphi_2 = \frac{2\pi}{V} F'(D_1 - D_2)$$

According to the above described conventional method the measurement is that of $$\varphi_1 - \varphi_2 = \frac{2\pi}{V}(F - F')(D_1 - D_2)$$

In contradistinction, our invention provides means for measuring in practice $\varphi_1$ or $\varphi_2$; now for a same modification in the parameter $D_1 - D_2$ the ratio between the modifications in value of $\varphi_1$ and of $\varphi_1 - \varphi_2$ is:

$$\frac{\varphi_1}{\varphi_1 - \varphi_2} = \frac{F}{F - F'} = \frac{F}{F_1 - F_3}$$

said ratio being substantially equal to 100 in the example referred to hereinabove.

In brief, it is found that the prior method consists in measuring a difference in phase which is the difference between two differences in phase varying proportionally to the difference $D_1 - D_2$ between said distances and with coefficients of proportionality the values of which are very near each other.

Obviously, under such conditions, the difference thus measured between these two values is very sensitive to the noises and disturbances of all kinds influencing said values defining differences in phase.

In contradistinction, the measurement of the phase shift with reference to the above referred to theoretical oscillator is incomparably less sensitive to such disturbances.

A more complete calculation resorting to transfer functions proves that the gain obtained is substantially equal to the ratio $$N = \frac{F}{(F_1 - F_3)}$$

In the preceding discussion regarding the central frequencies F and F' in the two receiver channels it was stated that 2F is equal to $F_1 + F_2$, hence $$N = \frac{F_1 + F_2}{2(F_1 - F_3)}$$

Our invention consists chiefly in executing a measurement by using at the receiver station a local oscillator which plays the part of the theoretical oscillator referred to hereinabove.

To this end, and according to our invention, the difference in phase is measured by comparing the phase of said local oscillator with that of one of the two channels, say the first channel. The division by N of the value thus measured gives the desired value $\varphi$ of the difference in phase; the value obtained when divided by N is identical with that obtained in accordance with the known method.

Furthermore, an unvarying phase relationship for the local oscillator in spite of the modifications due both to the modifications in the nominal value of the beat frequency $f$ and to the possible drift of the local oscillator is maintained by comparing in a phase discriminator the voltage of the second channel with that of the first channel after it has been phase shifted by a value $\varphi$. The output voltage of said discriminator serves for controlling the local oscillator which is provided for this purpose with means adapted to modify its frequency in conformity with the control voltage supplied by the discriminator.

According to a further feature of the invention, the time constant corresponding to the operation of last mentioned means is given a large value so as to weaken considerably the action of any disturbances appearing in the two channels.

We will now describe with further detail our invention together with its chief features, references being made to the accompanying drawings illustrating a preferred embodiment incorporating rotary phase shifters controlled by an auxiliary motor.

In said drawings:

FIGS. 2 and 3 illustrate respectively a conventional transmitter used for radio locating purposes and a transmitter according to our invention.

Figure 1:
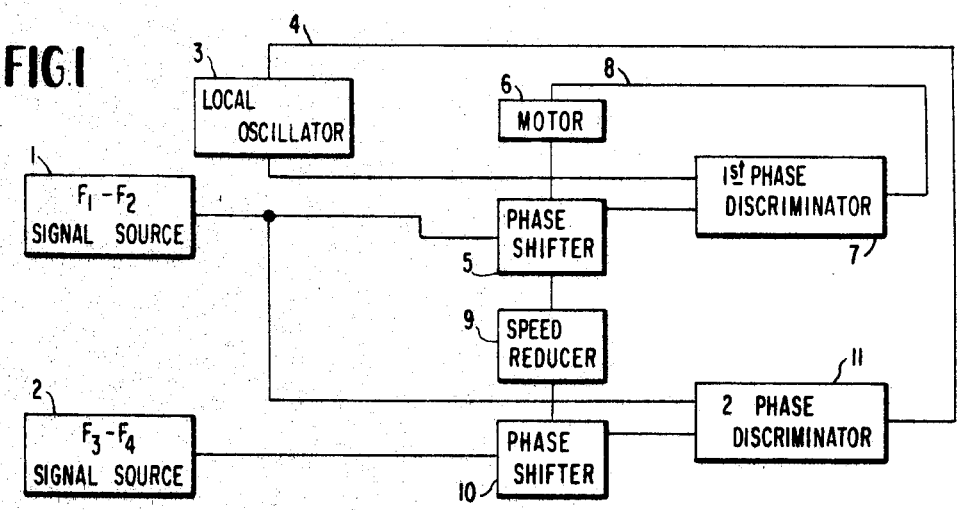
FIG. 1 illustrates a receiver in accordance with the invention.

The receiver illustrated in FIG. 1 includes the conventional sections 1 and 2 supplying respectively beat frequencies $F_1 - F_2$ for the channel I and $F_3 - F_4$ for the channel II.

According to the conventional method, said voltages are fed to a phase-meter supplying the desired value $\varphi$ whereas according to our invention, a very stable local oscillator 3 is used the frequency of which may be slightly modified by a control voltage fed by the connection 4.

The voltage in the channel I is phase-shifted by an amount $N\varphi$ by means of a rotary phase shifter 5 the shaft of which is controlled by an auxiliary motor 6, N being given the value $$\frac{F}{F_1-F_3}$$

referred to hereinabove. The voltage thus phase shifted is applied together with the output of the local oscillator 3 to a phase discriminator 7.

The output voltage of said discriminator controls the motor 6 through the connection 8 in accordance with a method well-known per se. Consequently, when the motor 6 is inoperative, the phase shifter 5 has rotated by an angle such that the phase-shifted voltage appearing at the output of said phase shifter 5 and produced by the first channel is in phase with the output voltage of the oscillator 3.

The shaft of the auxiliary motor 6 drives also through a speed reducer 9 supplying a speed reducing ratio N another phase shifter 10 adapted to shift by an amount $-\varphi$ the phase of the voltage in the second channel II.

The voltage at the output end of the phase shifter 10 is compared in a second phase discriminator 11 with the voltage at the output of the section 1. The output voltage of the discriminator 11 is fed through the connection 4 so as to control the operation of the oscillator 3 in a manner such that the frequency of said oscillator may be constantly equal to the beat frequency $f$.

The angular position of the shaft of the phase shifter 10 gives consequently the desired measurement of the phase shifting $\varphi$.

It should be remarked that it is possible to insert the phase shifter 10 in the connection between the channel 1 and the phase discriminator 11 in which case the phase shift to be obtained would be equal to $+\varphi$ instead of $-\varphi$.

It will be readily ascertained that, by reason of the large time constant of the means modifying the frequency of the oscillator 3, the disturbances even of a low frequency affecting the channels I and II exert no action on the operation of the local oscillator which is sensitive only to slow continuously acting drifts. In contradistinction, the speed of response of the receiver thus executed is practically identical with that of the conventional receiver, since it is defined by the time constant of the loop 5, 6, 7, which loop is designed in the same manner as in the case of an advantageous known embodiment of the conventional method.

In order to benefit to a maximum extent by the improvement brought to the above described receiver, it is obviously essential for the common value $f$ of the frequency of the beat waves between $F_1$ and $F_2$ and between $F_3$ and $F_4$ respectively to remain sufficiently stable and to drift only very slowly.

Now, the known method used for transmission does not satisfy said essential condition unless an exaggeratedly intricate structure is resorted to.

The conventional transmitting method is illustrated diagrammatically in FIG. 2 showing at 20 the transmitter located at the point A and radiating waves of frequencies $F_1$ and $F_3$.

The other transmitter located at B includes an oscillator 21 supplying the frequency $F_4$ and an oscillator 22 supplying the frequency $F_2$. Said oscillators feed a common amplifier 23 radiating simultaneously the frequencies $F_2$ and $F_4$.

In order to satisfy the conditions referred to hereinabove, that is with a view to obtaining equality between the two beat frequencies $F_1-R_2$ and $F_3-F_4$, as also the locking of the phases at constant values, a control receiver 24 is provided in proximity with the transmitter located at B. Said receiver 24 receives the four radiated waves and produces the two beat frequencies $F_1-F_2$ and $F_3-F_4$ which are fed into a discriminator 25 the output voltage of which controls one of the transmitters, say the oscillator 22 supplying the frequency $F_2$ so as to satisfy the requirements as to synchronisation in frequency and in phase.

With such a simple embodiment and by reason of the high value of the four frequencies $F_1$ to $F_4$, the value of the beat frequency $f$ may vary considerably, unless extremely stable oscillators are used, which oscillators are very expensive, this considerable possible drift of the beat frequency being ascribable to the very high value of the ratio $F_1/f$.

Our invention provides a modification in such a transmitting system with a view to providing synchronisation for phase and frequency while ensuring stabilisation of the common value $f$ of the beat frequencies.

Figure 3:
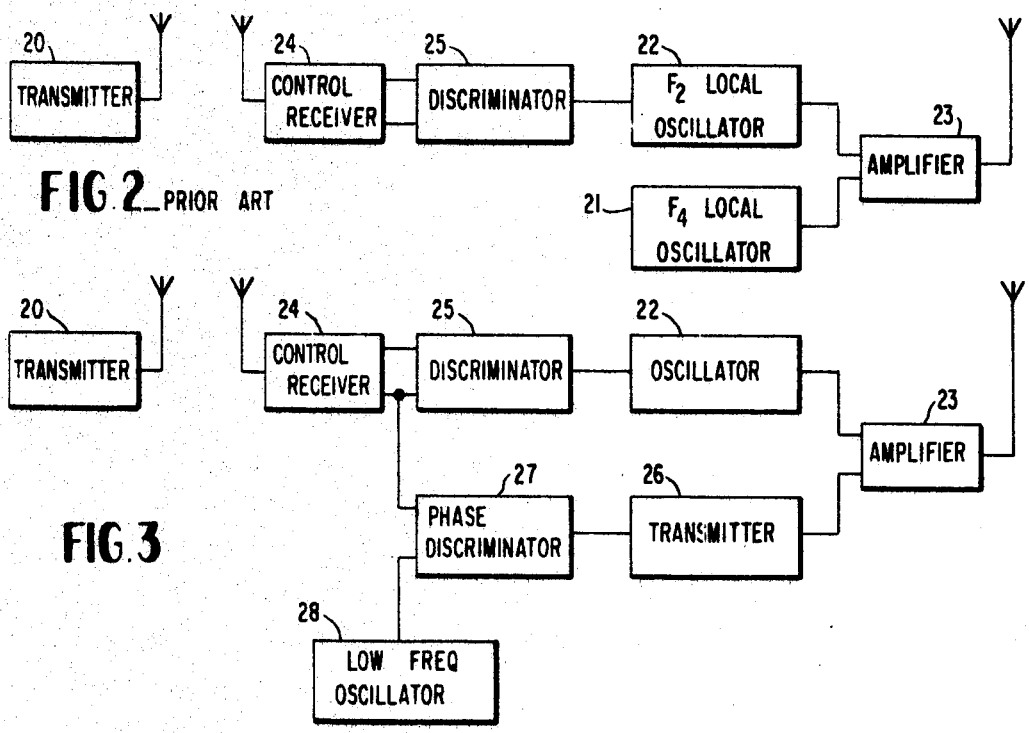

FIG. 3 illustrates said modification of the two transmitter system which allows obtaining such a result.

The transmitter 20 at the station A is not modified. In the prior embodiment illustrated in FIG. 2, the oscillator 21 supplying the frequency $F_4$ is free from control. In the embodiment according to our invention, said transmitter is also controlled in a manner such that the beat frequency value may be stabilized.

In FIG. 3, the oscillator 22 and the common amplifier 23 are retained as in the case of FIG. 2. The control receiver 24 is also retained so as to control as previously the frequency of the oscillator 22 through the agency of the discriminator 25.

The oscillator 21 is replaced in FIG. 3 by an oscillator 26 the frequency of which may be modified in the same manner as that of the oscillator 22 under the action of a contral voltage.

The desired stabilisation may be obtained in different manners. In the case illustrated, the beat voltage of one of the channels, say that corresponding to the beat frequency $F_1-F_2$ is compared in a phase discriminator 27 with the voltage of a stable low frequency oscillator 28 supplying the beat frequency $f$, the output voltage of said phase discriminator controlling the generator or transmitter 26.

It is also possible to cut out the oscillator 28 and to design the discriminator 27 as a frequency discriminator incorporating resonating circuits defining an average frequency equal to the beat frequency $f$.

It is finally possible, as a modification, to resort to a generator 28 acting on the one hand on the discriminator 27 as disclosed and also on the discriminator 25 in which case the two inputs of the discriminator 25 are then constituted on the one hand by the output voltage of the channel I in the receiver 24 and, on the other hand, by the voltage supplied by the low frequency oscillator 28 with the voltage of the second channel II feeding one of the inputs of the discriminator 27.

What we claim is:

1. A radiolocating method of the type employing a first transmitter for radiating two pure waves $F_1$ and $F_3$ and a second transmitter for radiating two pure waves $F_2$ and $F_4$, and a receiver station to produce beat waves of equal frequencies $f=F_1-F_2=F_3-F_4$ in corresponding channels of the receiver station, said method being characterized by producing at the receiver station a local frequency tuned substantially to said beat frequency $f$, measuring the phase difference between said local frequency and that fed by one of said channels, dividing said phase difference by a predetermined figure $$N=\frac{F_1+F_2}{2(F_1-F_3)}$$

so as to produce the desired radiolocating measurement, phase-shifting the frequency in one of the channels with said divided phase difference, comparing the phase-shifted frequency with the beat frequency in the other channel to produce an adjusting voltage, and maintaining the local frequency $f$ constant with said adjusting voltage.

2. A radiolocating system comprising two transmitters each radiating two pure waves of frequencies $F_1$ and $F_3$ and $F_2$ and $F_4$, respectively, and a receiver provided with two channels adapted to produce the beat waves $F_1-F_2$ and $F_3-F_4$, respectively, at a frequency $f$, said receiver including an oscillator for producing local waves substantially at said beat frequency $f$, a first phase discriminator having supplied thereto as inputs said local frequency and that of the beats in one of the channels for producing an output signal representative of their phase difference, a phase shifter inserted between said one receiver channel and said first phase discriminator, an auxiliary motor controlled by said first phase discriminator and driving said phase shifter, a further phase shifter connected with the output of the other channel and driven by the motor, a speed reducer coupled intermediate the further phase shifter and the motor for driving said further phase shifter at a speed reduced with reference to that of the first mentioned phase shifter in a ratio which is equal to a predetermined figure N and defining the desired phase to be measured where $$N = \frac{F_1 + F_2}{2(F_1 - F_3)}$$

and a second phase discriminator for comparing the output of the further phase-shifter with the beat frequency of said one channel and having its output connected with the oscillator to ensure constancy of the frequency $f$ of the local waves produced by said oscillator.

3. A radiolocating system as claimed in claim 2 wherein the beats produced by the waves radiated by the transmitters are stabilized by a phase discriminator coupled to one of the transmitters for comparing the beats produced of one of the waves produced by said one transmitter with the corresponding beat waves of the other transmitter and for stabilizing the waves radiated by said one transmitter with the output thereof.

4. A receiver for a radiolocating system of the type employing two transmitters each radiating two pure waves of frequencies $F_1$ and $F_3$ and $F_2$ and $F_4$, respectively, said receiver being provided with two channels adapted to produce the beat waves $F_1-F_2$ and $F_3-F_4$, respectively, at a frequency $f$, and including an oscillator for producing local waves substantially at said beat frequency $f$, a first phase discriminator having supplied thereto as inputs said local frequency and that of the beats in one of the channels for producing an output signal representative of their phase difference, a phase shifter inserted between said one receiver channel and said first phase discriminator, an auxiliary motor controlled by said first phase discriminator and driving said phase shifter, a further phase shifter connected with the output of the other channel and driven by the motor, a speed reducer coupled intermediate the further phase shifter and the motor for driving said further phase shifter at a speed reduced with reference to that of the first mentioned phase shifter in a ratio which is equal to a predetermined figure N and defining the desired phase to be measured where $$N = \frac{F_1 + F_2}{2(F_1 - F_3)}$$

and a second phase discriminator for comparing the output of the further phase-shifter with the beat frequency of said one channel and having its output connected with the oscillator to ensure constancy of the frequency $f$ of the local waves produced by said oscillator.

References Cited

UNITED STATES PATENTS

| | | | |
|---|---|---|---|
| 2,974,318 | 3/1961 | Koeppel | 343—105 |
| 3,150,372 | 9/1964 | Groth | 343—105 X |
| 3,237,196 | 2/1966 | Hampton. | |
| 3,242,492 | 3/1966 | Honore et al. | 343—105 |

RODNEY D. BENNETT, *Primary Examiner.*

H. C. WAMSLEY, *Assistant Examiner.*